United States Patent
Tateyama

[19]
[11] Patent Number: 5,993,518
[45] Date of Patent: Nov. 30, 1999

[54] DEAERATING APPARATUS, DEAERATING METHOD, AND TREATMENT APPARATUS

[75] Inventor: Kiyohisa Tateyama, Kumamoto, Japan

[73] Assignee: Tokyo Electron Limited, Tokyo, Japan

[21] Appl. No.: 09/023,184

[22] Filed: Feb. 13, 1998

[30] Foreign Application Priority Data

Feb. 14, 1997 [JP] Japan .................................. 9-044866

[51] Int. Cl.⁶ .................................................. B01D 19/00
[52] U.S. Cl. .............................. 95/261; 95/266; 96/157; 96/196; 96/216; 96/214
[58] Field of Search ........................... 95/261, 260, 266; 96/157, 196, 195, 194, 193, 216, 204, 206, 208, 214

[56] References Cited

U.S. PATENT DOCUMENTS

| | | | |
|---|---|---|---|
| 4,360,428 | 11/1982 | Comparetto et al. ...................... | 96/195 |
| 4,908,048 | 3/1990 | Hofmann et al. .......................... | 96/196 |
| 5,000,766 | 3/1991 | Yano et al. ................................. | 96/196 |
| 5,190,515 | 3/1993 | Eaton et al. ................................ | 96/196 |
| 5,626,913 | 5/1997 | Tomoeda .................................. | 427/299 |

FOREIGN PATENT DOCUMENTS 9-7936  1/1997  Japan .

*Primary Examiner*—Richard L. Chiesa
*Assistant Examiner*—Robert A. Hopkins
*Attorney, Agent, or Firm*—Foley & Lardner

[57] ABSTRACT

A deaerating apparatus for removing a gas from a liquid, including a liquid container rotatable and storing the liquid from which the gas is to be removed, a rotating device for rotating the liquid container, a sucking device for absorbing the gas from the liquid container; a feed-out device for feeding out the liquid stored in the liquid container, a liquid introducing pipe for introducing the liquid into the liquid container, a gas exhausting pipe for exhausting the gas from the liquid container, a liquid feed-out pipe for feeding out the liquid from the liquid container, and a head member which is removably placed on the liquid container, with the head member in contact with the liquid container. With the head member separated a predetermined interval from the liquid container, the liquid container is rotated to collect the gas contained in the liquid to the center of the liquid container. Then, the gas in the liquid container is absorbed, with the liquid container semi-closed. In this manner, the gas contained in a liquid such as a resist solution, a developing solution, and a solvent can be removed sufficiently.

22 Claims, 8 Drawing Sheets

DEAERATING APPARATUS, DEAERATING METHOD, AND TREATMENT APPARATUS

BACKGROUND OF THE INVENTION

1. Field of the Invention

The present invention relates to a deaerating apparatus for deaerating a resist solution which is applied to a substrate of a liquid crystal display device (LCD) or the like; a deaerating method; and a treatment apparatus using the deaerating apparatus.

2. Description of the Related Art

Generally, in fabricating an LCD substrate, a circuit pattern is formed by photolithography technique; a resist solution is applied to the LCD substrate and exposed to light beams in correspondence to the circuit pattern; and then the circuit pattern is developed.

In the resist-applying and developing treatments, a developing solution and a resist solvent such as thinner are used in addition to the resist solution. These treatment solutions contain gas for various reasons. The gas causes the following disadvantages.

For example, if the resist solution containing gas is applied to the substrate, it foams thereon. Consequently, the substrate is covered with the resist solution nonuniformly. Similarly, if the developing solution containing gas is applied to the substrate, it foams thereon. Consequently, the substrate is partly undeveloped. If a solvent such as thinner contains gas, pores are formed on a resist film.

To solve such problems, the following deaerating methods are proposed:

As a known liquid-deaerating method (first example), using a vacuum pump, a liquid accommodated in a pressure-reduced tank is deaerated under vacuum.

According to the method (second method) of deaerating a developing solution disclosed in Laid-Open Japanese Patent Application No. 9-7936, a liquid flowing in a tube made of fluororesin is vacuum-aerated in the outside of the tube to remove only gas from the liquid through pin holes thereof.

The method of the first example is capable of deaerating the inner part of the liquid to a comparatively high degree, whereas it deaerates its inner part insufficiently. That is, the method has a poor deaerating performance.

In the method of the second example, because it is impossible to reduce the thickness of the tube not to make the degree of its strength low, the tube has a low degree of gas permeability. Thus, the method has an insufficient deaerating performance. In addition, the method necessitates the installation of equipments of a large scale because it is necessary to supply a large amount of treatment solution to the process of applying the resist solution to LCD substrates and developing the circuit pattern.

SUMMARY OF THE INVENTION

It is an object of the present invention to provide a deaerating apparatus capable of sufficiently removing a gas contained in a liquid, a deaerating method, and a treatment apparatus using the deaerating apparatus.

It is another object of the present invention to provide a deaerating apparatus capable of removing a large amount of a gas contained in a liquid, a deaerating method, and a treatment apparatus using the deaerating apparatus.

It is still another object of the present invention to provide a deaerating apparatus having a simple construction and a treatment apparatus using the deaerating apparatus.

In order to solve the problems, a deaerating apparatus, according to the first invention, for removing a gas from a liquid comprises a liquid container rotatable and storing the liquid from which the gas is to be removed; a rotating means for rotating the liquid container; a sucking means for absorbing at least the gas from the liquid container; and a feed-out means for feeding out the liquid stored in the liquid container.

A treatment apparatus, according to the second invention, for effecting a predetermined treatment by supplying a substrate with a liquid comprises a treatment liquid supplying nozzle for supplying the substrate with a treatment liquid; a treatment liquid feed-out means for feeding the treatment liquid to the treatment liquid supplying nozzle; a treatment liquid pipe interposed between the treatment liquid feed-out means and the treatment liquid supplying nozzle; and a deaerating apparatus, positioned on the treatment liquid pipe, for removing a gas from the treatment liquid. The deaerating apparatus comprises a liquid container rotatable and storing a liquid from which a gas is to be removed; rotating means for rotating the liquid container; a sucking means for absorbing at least the gas from the liquid container; and a feed-out means for feeding out the liquid stored in the liquid container.

A deaerating method, according to the third invention, of detecting a gas contained in a liquid comprises the steps of introducing the liquid containing the gas into a liquid container; rotating the liquid container; and absorbing at least the gas present inside the liquid container, thus exhausting the gas to an outside of the liquid container.

According to the present invention, the liquid container is rotated to collect a gas contained in a liquid to the center of the liquid container. Then, at least the gas is exhausted to the outside of the liquid container by sucking it up. Therefore, the deaeration can be accomplished very efficiently. That is, the gas contained in the liquid can be removed with a high efficiency. More specifically, owing to centrifuging caused by the rotation of the liquid container, a gas having a low specific gravity is collected to the center of the liquid container. Thus, the liquid at the peripheral part of the liquid container and that at the lower part thereof contain gas very little. That is, the deaerating apparatus has a very high deaerating efficiency because it absorbs at least the gas contained in the liquid and positioned at the upper center of the liquid container.

These and other objects, features, and advantages of the present invention will become more apparent in light of the following detailed description of a best mode embodiment thereof, as illustrated in the accompanying drawings.

DESCRIPTION OF PREFERRED EMBODIMENTS

Embodiments of the present invention will be described below with reference to the drawings.

Figure 1:
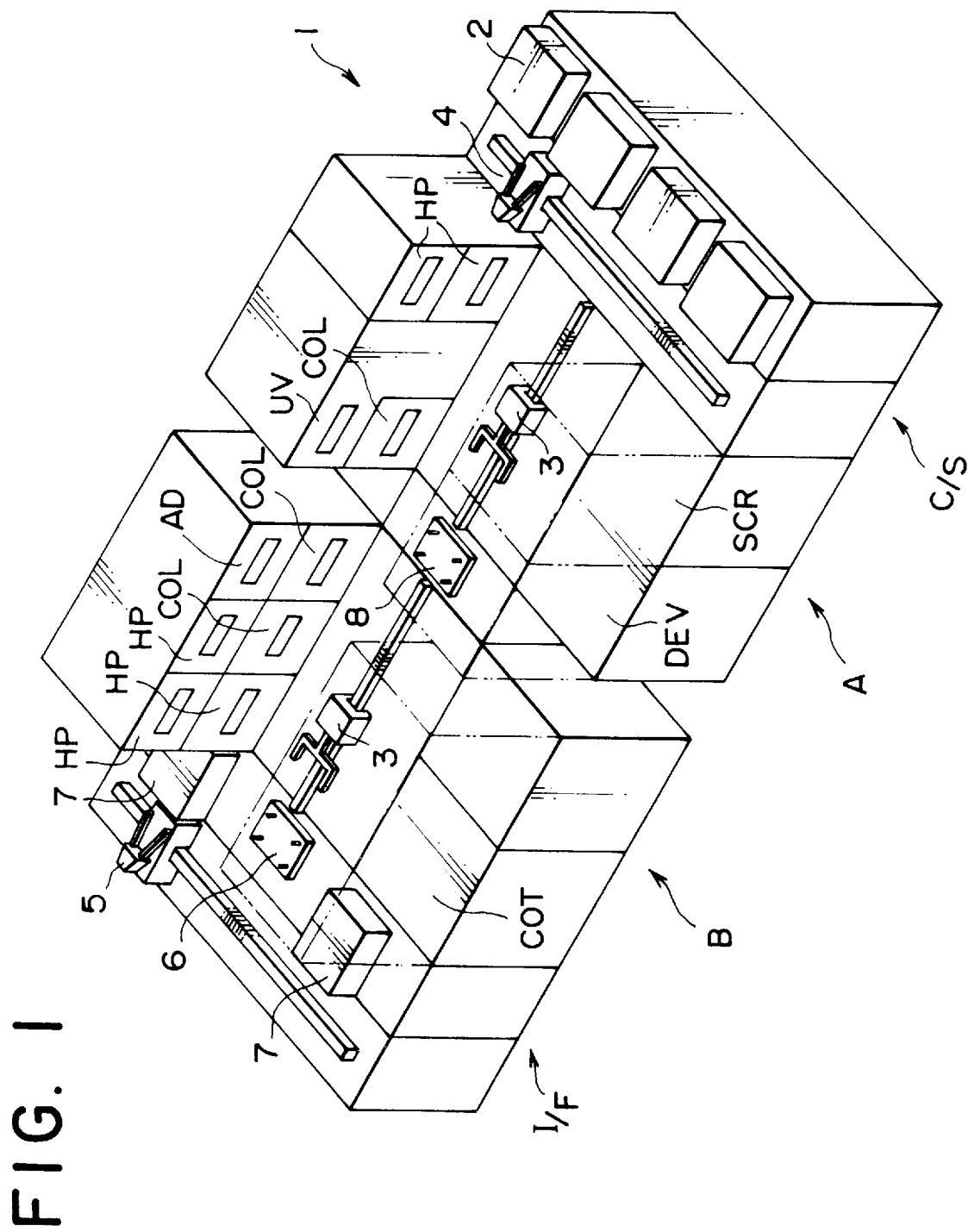
FIG. 1 is a perspective view showing a coating and developing apparatus according to an embodiment of the present invention.
Figure 2:
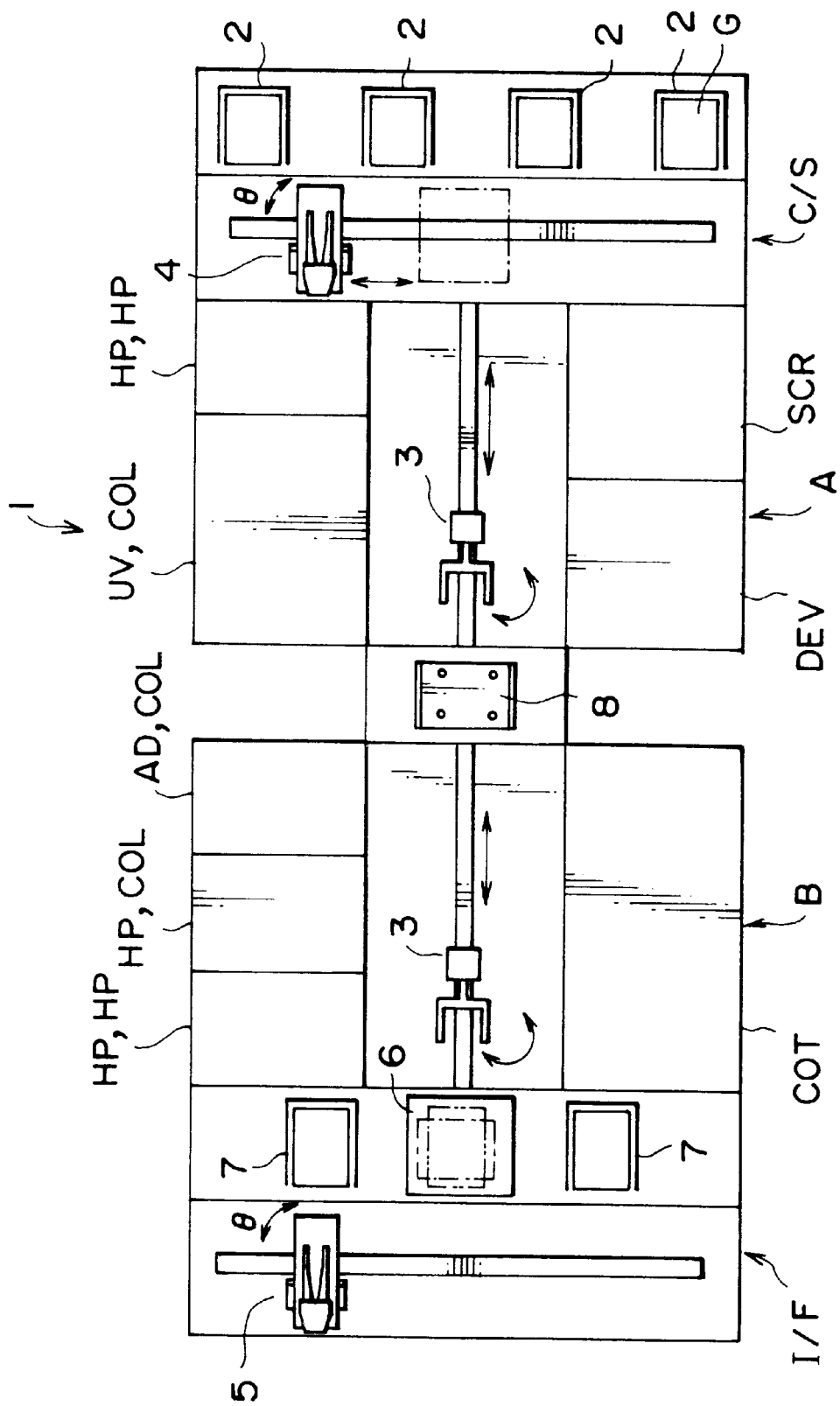
FIG. 2 is a plan view showing the coating and developing apparatus shown in FIG. 1.

FIG. 1 is a perspective view showing a coating and developing apparatus according to an embodiment of the present invention. FIG. 2 is a plan view showing the coating and developing apparatus shown in FIG. 1.

The coating and developing apparatus 1 has a cassette station C/S positioned at one side thereof and an interface unit I/F positioned at the other side thereof in the lengthwise direction (right-to-left direction in FIGS. 1 and 2) of the coating and developing apparatus 1. The interface unit I/F transfers a to-be-treated glass substrate G to an unshown exposing unit and receives it therefrom.

A plurality of cassettes 2, e.g., four cassettes 2 each accommodating substrates G such as LCD substrates are placed on the cassette station C/S. An auxiliary arm 4 is positioned adjacently to the cassette 2 of the cassette station C/S. The auxiliary arm 4 feeds the substrate G, places it in position, transfers it to a main arm 3, and receives it therefrom.

On the interface unit I/F, there is provided an auxiliary arm 5 which transfers the substrate G to the exposing unit and receives it therefrom. An extension part 6 and a buffer unit 7 are positioned on the interface unit I/F. The extension part 6 transfers the substrate G to the main arm 3 and receives it therefrom. At the buffer unit 7, the substrate G waits for a predetermined period of time.

Two main arms 3 are arranged in series in the center of the coating and developing apparatus 1 in the widthwise direction thereof in such a manner that they are movable in the lengthwise direction of the coating and developing apparatus 1 along a transferring path running through the center of the coating and developing apparatus 1 in the lengthwise direction thereof. First and second treatment unit groups A and B are positioned at both sides of the transferring path of each main arm 3, respectively. A relay part 8 for temporarily holding and cooling the substrate G is interposed between first treatment unit group A and the second treatment unit group B.

In the first treatment unit group A, at one side of the transferring path of the main arm 3, a cleaning unit SCR for cleaning the substrate G is positioned alongside the cassette station C/S; and a developing unit DEV is positioned alongside the cleaning unit SCR. At the other side of the transferring path of the main arm 3, upper and lower heat treatment units HP are arranged; and a ultraviolet ray treatment unit UV and a cooling unit COL are vertically arranged adjacently to the heat treatment units HP.

In the second treatment unit group B, at one side of the transferring path of the main arm 3, there is provided a resist application unit COT applying resist to the substrate G and removing an edge thereof. At the other side of the transferring path of the main arm 3, there are provided an adhesion unit AD for performing a hydrophobic treatment of the substrate G and a cooling unit COL positioned below the adhesion unit AD; a heat treatment unit HP positioned adjacently to the adhesion unit AD and another cooling unit COL positioned below the heat treatment unit HP and adjacently to the cooling unit COL; and upper and lower heat treatment units HP positioned adjacently to the buffer unit 7. A thermal interference between the heat treatment unit HP and the cooling unit COL can be avoided by locating the heat treatment unit HP above the cooling unit COL. Thus, a correct temperature control can be accomplished.

The main arm 3 is provided with an X-axis driving mechanism, a Y-axis driving mechanism, a Z-axis driving mechanism, and a rotation driving mechanism which rotates on the Z-axis. The main arm 3 travels along the transferring path of the coating and developing apparatus 1 to transfer the substrate G to each treatment unit and takes out the substrate G therefrom after it is treated in accordance with the treating process.

As described above, the coating and developing apparatus 1 of the embodiment have the treatment units arranged so compactly that it occupies a small space and treats the substrate G efficiently.

The operation of the coating and developing apparatus 1 having the construction will be described below.

Initially, the substrate G accommodated in the cassette 2 is transported to the cleaning unit SCR through the auxiliary arm 4 and the main arm 3 to clean it.

Then, the substrate G is transported to the adhesion unit AD through the main arm 3, the relay part 8, and the main arm 3 so that the adhesion unit AD performs a hydrophobic treatment of the substrate G to allow the resist to fix thereto to a high degree.

Then, the substrate G is transported to the cooling unit COL through the main arm 3 to cool it. Thereafter, it is transported to the resist application unit COT through the main arm 3 to apply the resist thereto.

Then, the substrate G is transported to the heat treatment unit HP through the main arm 3 to pre-bake it. After the substrate G is fed to the cooling unit COL through the main arm 3 to cool it, it is fed to the exposing unit through the main arm 3 and the interface unit I/F to expose the resist to light beams in correspondence to a predetermined circuit pattern.

Thereafter, the substrate G is fed back to the coating and developing apparatus 1 through the interface unit I/F and then fed to the other heat treatment unit HP through the main arm 3 to post-expose and bake it.

Then, the substrate G is fed to the other cooling unit COL through the main arm 3, the relay part 8, and the main arm 3 to cool it. Then, the substrate G is fed to the developing unit DEV through the main arm 3 to develop it. As a result, a predetermined circuit pattern is formed thereon. The substrate G is then fed to the ultraviolet ray treatment unit UV through the main arm 3 to effect a ultraviolet ray treatment thereof.

The substrate G is then fed to the predetermined cassette 2 placed on the cassette station C/S through the main arm 3 and the auxiliary arm 4 to accommodate it therein.

Figure 3:
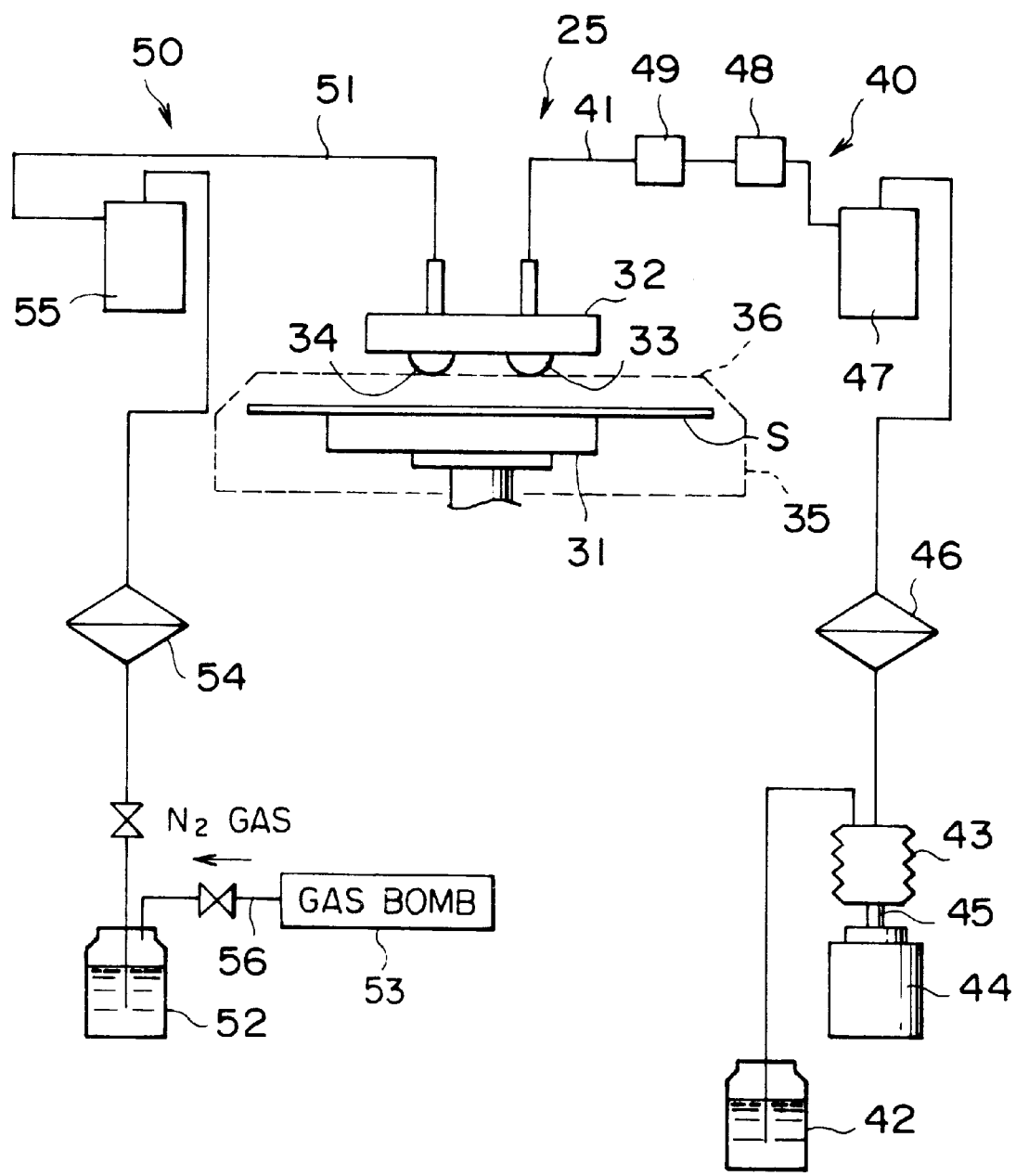
FIG. 3 is a schematic diagram showing a resist solution and solvent supplying system of a resist application unit provided with a deaerating apparatus of the present invention.

FIG. 3 is a schematic diagram showing a resist solution and solvent supplying system of the resist application unit COT.

The resist application unit COT has a spin chuck 31 sucking the substrate G to hold it thereon. A nozzle holder 32 is positioned above the spin chuck 31. The nozzle holder 32 has a resist solution nozzle 33 and a solvent nozzle 34 mounted thereon. The resist solution nozzle 33 and the solvent nozzle 34 are moved along one side of the substrate G by the movement of the nozzle holder 32, with a short interval spaced between them and the substrate G. The resist solution nozzle 33 and the solvent nozzle 34 are connected with a resist solution supplying system 40 and a solvent supplying system 50, respectively. The substrate G held by the spin chuck 31 is surrounded with a rotatable cup 35 which is sealed with a cover 36 while the resist is being applied to the substrate G. As the resist solution nozzle 33 and the solvent nozzle 34, a stream nozzle having a single discharging opening formed on the bottom thereof or a multi-nozzle having a plurality of discharging openings formed on the bottom thereof is used.

The resist solution supplying system 40 has a resist solution supplying pipe 41. The resist solution nozzle 33 is installed at the resist solution supplying pipe 41 at one end thereof. A resist solution container 42 is mounted on the resist solution supplying pipe 41 at the other end thereof. A bellows pump 43 supplies the resist solution nozzle 33 with a resist solution contained in the resist solution container 42. In order for the bellows pump 43 to absorb the resist solution from the resist solution nozzle 33 and supply it thereto, a stepping motor 44 is driven to rotate a ball screw 45.

The resist solution fed out from the bellows pump 43 is applied to the substrate G from the resist solution nozzle 33 through a filter 46, a deaerating apparatus 47 (described later), an air operation valve 48, and a suck-back valve 49. The air operation valve 48 has a function of opening and closing the supplying path of the resist solution. The suck-back valve 49 has a function of sucking the resist solution remaining at the tip of the resist solution nozzle 33 back to the resist solution container 42. Thus, the resist solution can be prevented from hardening.

The solvent solution supplying system 50 has a solvent supplying pipe 51. The solvent nozzle 34 is installed at the solvent supplying pipe 51 at one end thereof. A solvent container 52 is mounted on the solvent supplying pipe 51 at the other end thereof. The solvent container 52 stores a solvent, e.g., thinner which is supplied to the solvent nozzle 34 through the filter 54 and a deaerating apparatus 55 which will be described later by feeding a pressurized gas, e.g., nitrogen gas contained in a gas bomb 53 to the solvent container 52. The solvent is applied to the substrate G from the solvent nozzle 34.

Figure 4:
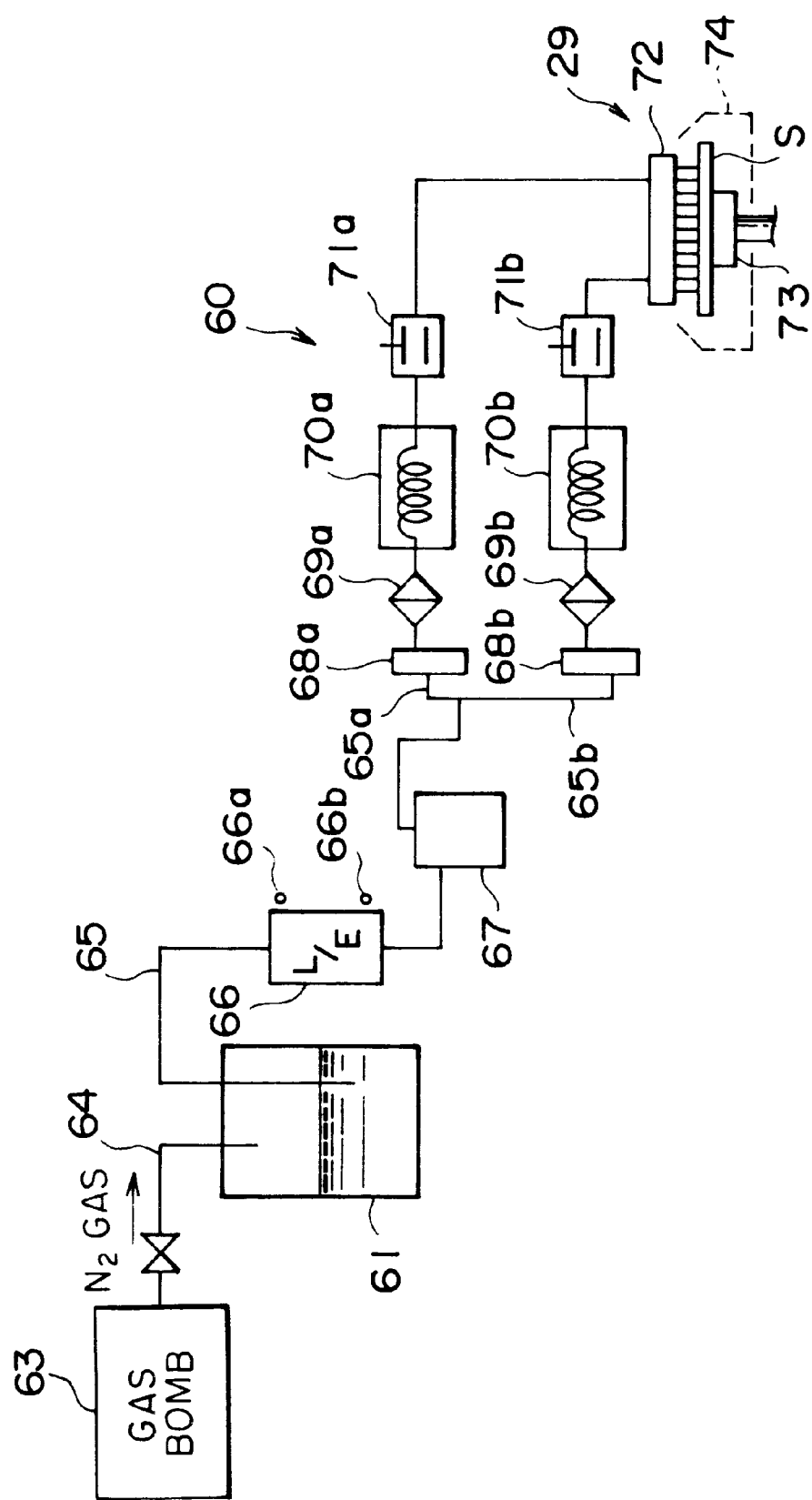
FIG. 4 is a schematic diagram showing a developing solution supplying system of a developing unit provided with a deaerating apparatus of the present invention.

FIG. 4 is a diagram showing a developing solution supplying system of the developing unit DEV.

The developing unit DEV has a chuck 73 sucking and holding the substrate G thereon. A nozzle 72 having almost the same width as that of the substrate G is positioned above the chuck 73. The nozzle 72 consists of a multi-nozzle having a plurality of liquid discharging openings formed at the bottom thereof in the lengthwise direction thereof. But instead, the nozzle 72 may consist of a stream nozzle having a single discharging opening formed at the bottom thereof. The nozzle 72 is connected with a developing solution supplying system 60. The nozzle 72 is moved along one side of the substrate G, with a short interval spaced between the nozzle 72 and the substrate G. The substrate G held by the chuck 73 is surrounded with a cup 74.

The developing solution supplying system 60 has a developing solution container 61 storing a developing solution. Through a pipe 64, the developing solution container 61 is connected with a gas bomb 63 storing nitrogen gas which is used as a pressurized gas. An end of a pipe 65 is immersed in the developing solution stored in the developing solution container 61. An intermediate container 66 and a deaerating apparatus 67 which will be described later are installed on the pipe 65. They are positioned at the downstream side of the developing solution container 61. The developing solution stored in the developing solution container 61 is supplied to the nozzle 72 through the pipe 65 by supplying the pressurized gas, namely, the nitrogen gas stored in the gas bomb 63 to the developing solution container 61. A limit sensor 66a and an empty sensor 66b consisting of electro-static capacity sensors are positioned outside the intermediate container 66. Upon receipt of signals outputted from the limit sensor 66a and the empty sensor 66b, an unshown controller controls the position of the surface of the developing solution.

At the downstream side of the deaerating apparatus 67, the pipe 65 is branched to a plurality of pipes, e.g., a pipe 65a and a pipe 65b. Between the deaerating apparatus 67 and the nozzle 72, flow meters 68a and 68b, filters 69a and 69b, water jackets 70a and 70b through which temperature-adjusting water circulates, and air operation valves 71a and 71b are installed on each of the pipes 65a and 65b in a direction from the upstream side to the downstream side thereof. The developing solution is supplied to the nozzle 72 through the pipes 65a and 65b. In developing the substrate G, the developing solution is applied to the substrate G from the liquid discharging holes formed at the bottom of the nozzle 72.

Figure 5:
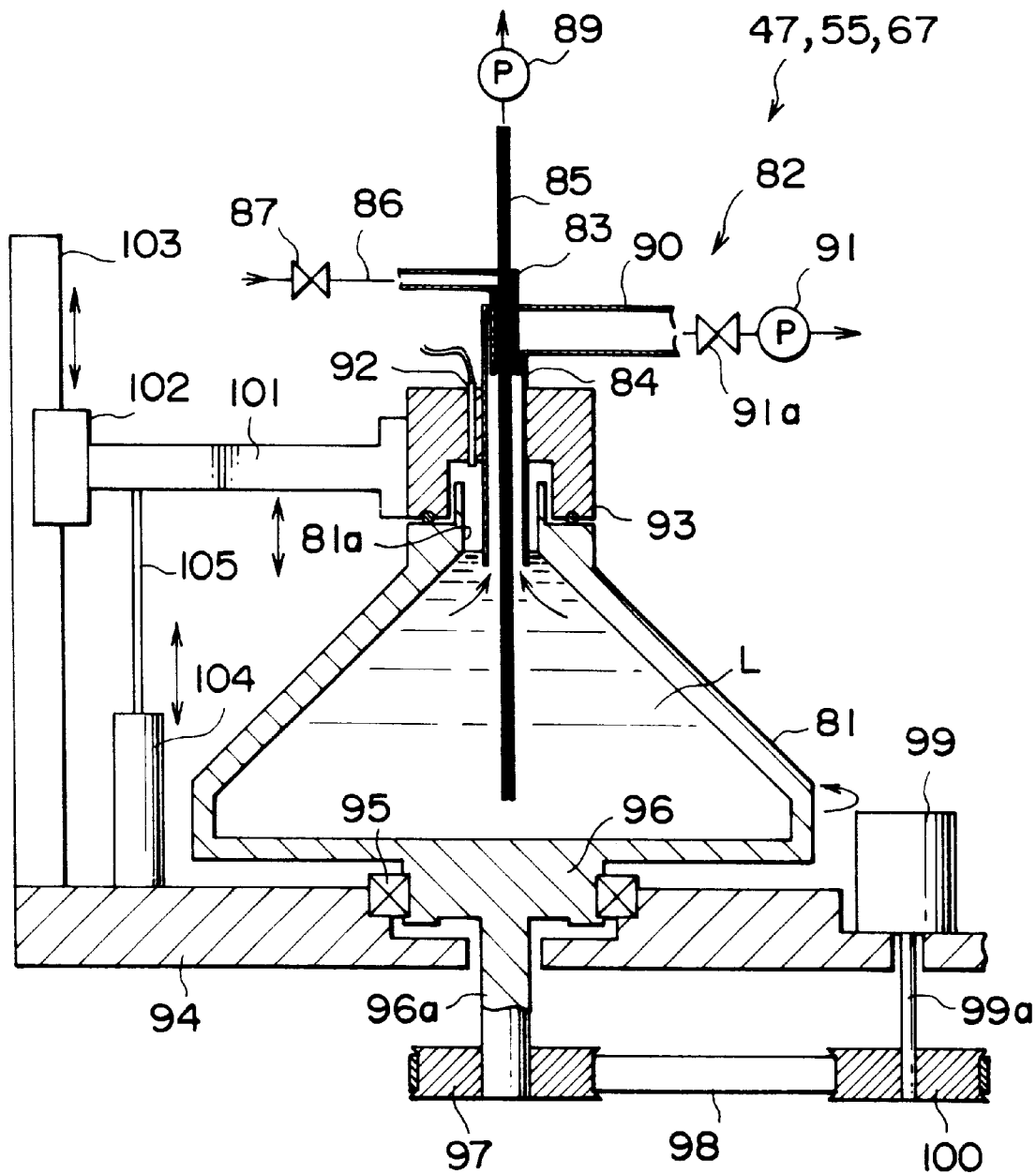
FIG. 5 is a sectional view showing a deaerating apparatus according to an embodiment of the present invention.

The deaerating apparatuses 47, 55, and 67 will be described below with reference to FIG. 5.

The constructions of the deaerating apparatuses 47, 55, and 67 are similar to one another in that each of them has a liquid container 81 storing a liquid containing a gas which is to be removed; and a head member 82 positioned above the liquid container 81.

The liquid container 81 approximately conic has an opening 81a at an upper portion thereof and is rotatable. A liquid from which a gas contained is to be removed is introduced into the liquid container 81 from the opening 81a. A level sensor 92 is positioned above the opening 81a. Based on signals outputted from the level sensor 92, a controller which will be described later controls a valve 87 to adjust the surface of the liquid to a predetermined level. A fin may be installed inside the liquid container 81.

The head member 82 comprises a liquid introducing pipe 83, a gas exhausting pipe 84 exhausting gas and liquid containing much amount of gas, and a liquid feed-out pipe 85. The liquid introducing pipe 83 is continuous with a liquid supplying pipe 86 supplying the liquid to the liquid container 81 from a liquid supplying source. The liquid introducing pipe 83 is positioned at the center of the head member 82, thus extending downward to a position confronting the opening 81a of the liquid container 81. The supply of the liquid to the liquid container 81 is controlled by the valve 87 installed on the liquid supplying pipe 86.

The gas exhausting pipe 84 continuous with an exhausting pipe 90 is positioned at the center of the head member 82, thus extending downward to a position below the surface of the liquid stored in the liquid container 81. The liquid introducing pipe 83 coaxial with the gas exhausting pipe 84 penetrates through the exhausting pipe 90. A vacuum pump 91 serving as an absorbing means for absorbing the gas and the liquid containing gas in the liquid container 81 is installed on the exhausting pipe 90 continuous with the gas exhausting pipe 84.

Coaxially with the liquid introducing pipe 83 and the gas exhausting pipe 84, the liquid feed-out pipe 85 extends vertically downward below the opening 81a to a position proximate to the bottom surface of the liquid container 81. A pump 89 mounted on the liquid feed-out pipe 85 feeds out the liquid.

It is possible to compose the absorbing means of other means such as an ejector, instead of the vacuum pump 91. That is, using a three-way valve 91a, a pressurized nitrogen gas is fed from the liquid introducing pipe 83 to the liquid feed-out pipe 85 to exhaust the gas and the liquid containing gas from the liquid container 81.

The head member 82 is vertically movable so that it contacts the liquid container 81 and separates therefrom. A sealing member 93 is interposed between the head member 82 and the liquid container 81.

A cylindrical projection 96 is formed downward from the center of the bottom of the liquid container 81. The cylindrical projection 96 is rotatably installed on a base member 94 through a bearing 95. A pulley 97 is mounted at the lower end of the shaft extending downward through the center of the cylindrical projection 96.

A motor 99 mounted on the base member 94 is positioned alongside the liquid container 81. The rotation shaft 99a of the motor 99 extends downward in penetration through the base member 94. A pulley 100 is mounted on the rotation shaft 99a at its lower end. The rotation of the motor 99 is transmitted to the liquid container 81 through a belt spanned on the pulleys 97 and 100.

A cylinder 104 for moving the head member 82 upward and downward is mounted on the base member 94. A supporting member 101 mounted on the head member 82 extends horizontally. A piston 105 of the cylinder 104 is connected with the supporting member 101. A slider 102 is mounted at an end of the supporting member 101 and vertically movably installed on a guide 103 extending vertically upward from the base member 94. Accordingly, the head member 82 is moved upward and downward by vertically reciprocating the piston 105 of the cylinder 104.

Figure 6:
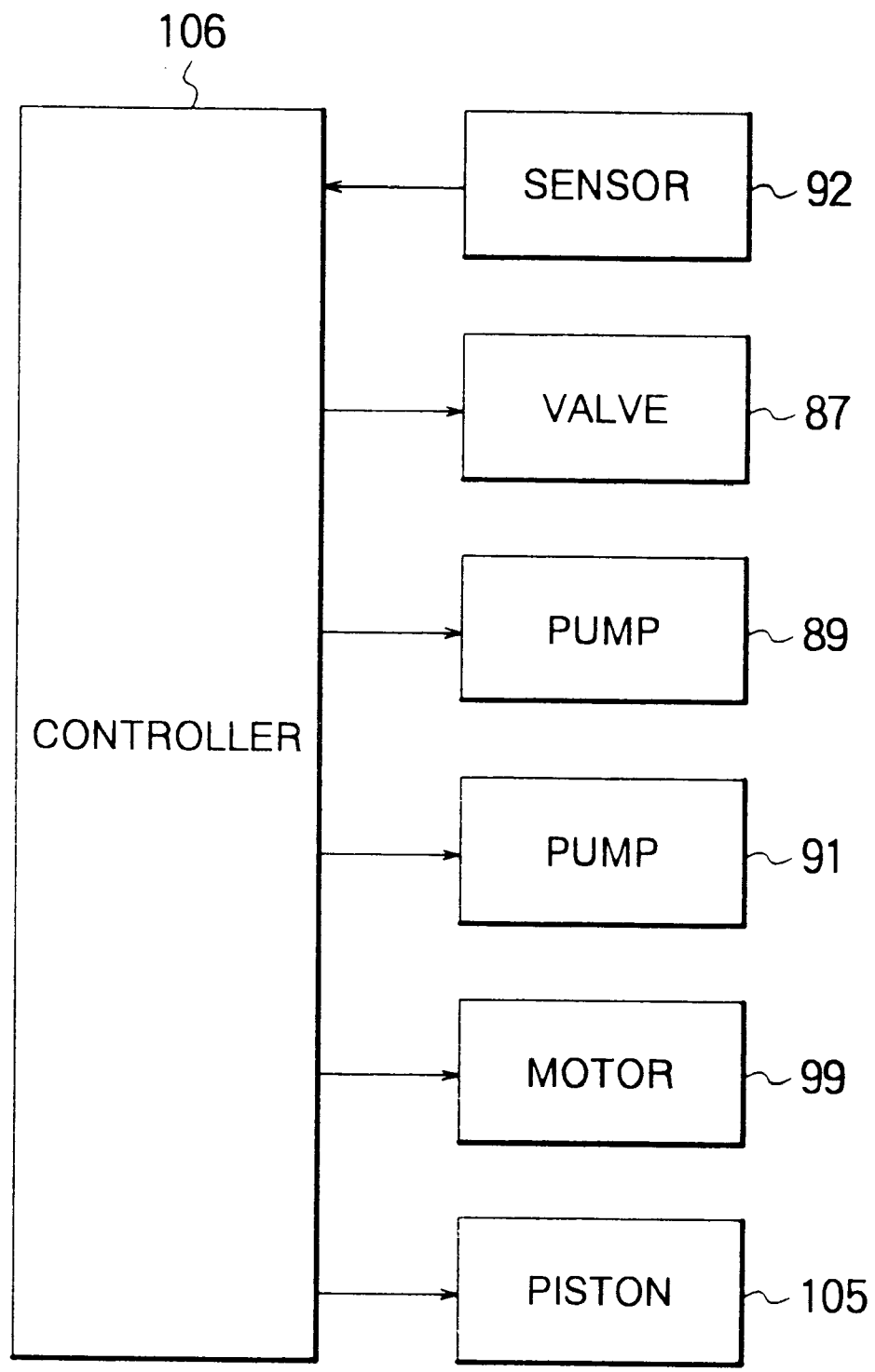
FIG. 6 is a sectional view showing a control system of a deaerating apparatus according to an embodiment of the present invention.

FIG. 6 is a block diagram showing the control system of the deaerating apparatus.

As shown in FIG. 6, a controller 106 controls the operation of the valve 87, the pumps 89 and 91, the motor 99, and the piston 105, upon receipt of signals transmitted from the level sensor 92.

Figure 7:
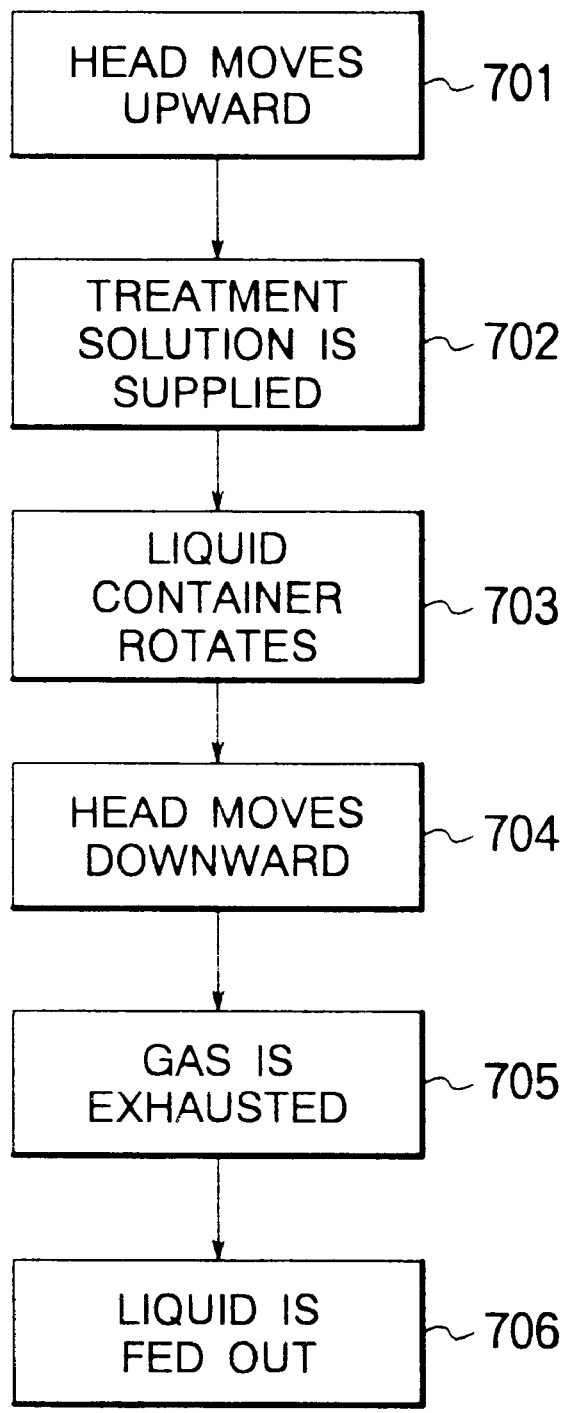
FIG. 7 is a view showing a control flow of a deaerating apparatus according to an embodiment of the present invention.

Operations which are performed under the control of the controller 106 will be described below with reference to FIGS. 5, 6, and 7.

When the head member 82 has been separated from the liquid container 81 and moved to the predetermined upward position (step 701), a treatment liquid corresponding to each treatment unit is supplied to the liquid container 81 through the liquid supplying pipe 86 and the liquid introducing pipe 83 of the head member 82 (step 702). When the surface of the liquid L has reached the predetermined level in the liquid container 81, the valve 87 is closed to stop the supply of the liquid L to the liquid container 81.

Then, the motor 99 is driven to rotate the liquid container 81 (step 703) at 100–3000 rpm, with the head member 82 located at the predetermined upward position. Owing to centrifuging caused by the rotation of the liquid container 81, a gas having a low specific gravity is collected to the center of the liquid container 81. Thus, a liquid at the peripheral part of the liquid container 81 and that at the lower part thereof contain very little gas.

Then, the liquid container 81 is stopped from rotating and the head member 82 is moved downward (step 704) to contact it with the liquid container 81, with the sealing member 93 interposed therebetween so that the liquid container 81 is semi-closed, i.e., the liquid container 81 is opened to such a low degree as to allow gas to be introduced thereinto from breathing holes. Then, the vacuum pump 91 is actuated to absorb the gas and the liquid containing gas collected to the center of the liquid L, namely, the center of the liquid container 81 to the outside of the liquid container 81 through the gas exhausting pipe 84 and the exhausting pipe 90 (step 705).

After the vacuum pump 91 completes the absorption of the gas and the liquid containing gas, the pump 89 is actuated to exhaust the gas-removed liquid from the liquid container 81 through the liquid feed-out pipe 85 (step 706).

As described above, because the vacuum pump 91 absorbs the gas and the liquid containing gas collected to the center of the liquid container 81 owing to the rotation of the liquid container 81, the deaeration can be accomplished very efficiently. That is, the liquid remaining in the liquid container 81 contains very little gas.

With the head member 82 separated at the predetermined interval from the liquid container 81, the liquid container 81 is rotated to collect the gas contained in the liquid to the center of the liquid container 81. Then, the vacuum pump 91 absorbs the gas and the liquid containing gas, with the head member 82 in contact with the liquid container 81. As apparent from the foregoing description, the deaerating apparatus has a simple construction, thus eliminating the need for performing a complicated deaerating operation. In the liquid exhausting operation, the liquid container 81 is semi-closed, i.e., the liquid container 81 is opened to such a small extent as to allow gas to be introduced thereinto from the breathing holes, with the sealing member 93 interposed between the liquid container 81 and the head member 82. Accordingly, the vacuum pump 91 absorbs the gas and the liquid containing gas efficiently.

Further, because the liquid container 81 is conic, gas can be collected to the upper center thereof by the rotation of the liquid container 81. Therefore, the gas can be sucked up with a high efficiency.

The present invention is not limited to the above-described embodiments, but various modifications can be accomplished.

Figure 8:
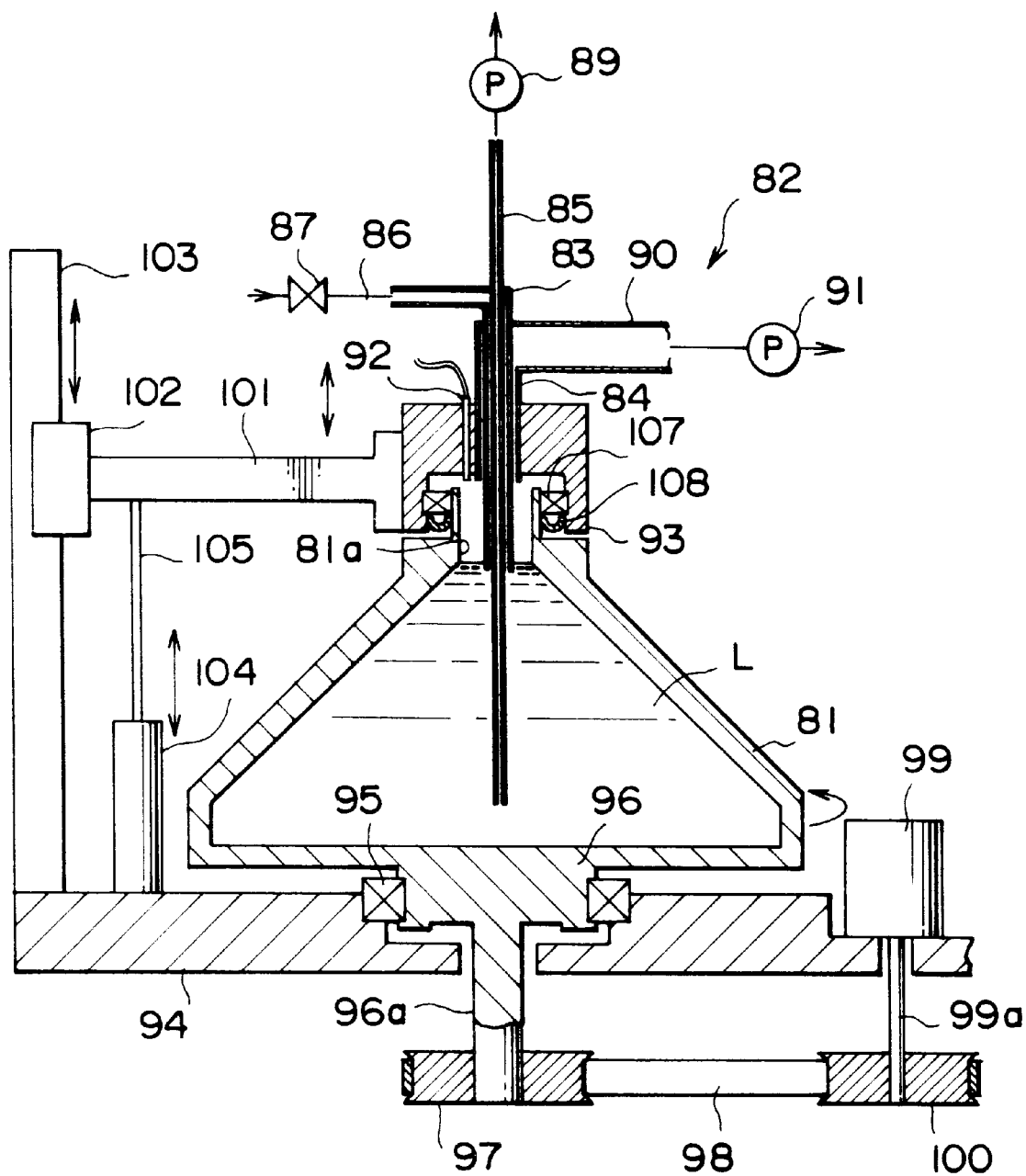
FIG. 8 is a sectional view showing a deaerating apparatus according to another embodiment of the present invention.

As shown in FIG. 8 showing a deaerating apparatus according to another embodiment of the present invention, it is possible to contact the head member 82 with the liquid container 81, with the liquid container 81 rotating to simultaneously supply the treatment solution which is to be deaerated to the liquid container 81 and exhaust the treatment solution which has been deaerated. In the deaerating apparatus shown in FIG. 8, the liquid container 81 contacts the head member 82 through a bearing 107 and a lip seal 108. The construction eliminates the need for the installation of the mechanism for moving the head member 82 upward and downward. In the construction, the liquid introducing pipe 83, the liquid feed-out pipe 85, and the exhausting pipe 90 are not necessarily coaxial with one another.

In addition to the application of the deaerating apparatus of the present invention to the coating and developing apparatus, it is applicable to other apparatuses.

The LCD substrate is treated by the apparatus of the present invention, but needless to say, other substrates such as a semiconductor wafer can be treated by the apparatus of the present invention.

It is possible to install the deaerating apparatus at positions other than that of the above-described embodiments.

The present invention is also applicable to deaerating apparatuses requiring the removal of gas from liquid, although the present invention is applied to treat a substrate with liquid.

As apparent from the foregoing description, according to the present invention, the liquid container is rotated to collect a gas contained in a liquid to the center of the liquid container. Then, at least the gas is removed from the liquid and exhausted to the outside of the liquid container by sucking it up. Therefore, the deaeration can be accomplished very efficiently. That is, the gas contained in the liquid can be removed with high efficiency.

The head member is removably placed on the liquid container, with the head member in contact with the liquid container. With the head member separated from the liquid container, the liquid container is rotated to collect the gas contained in the liquid to the center of the liquid container. Then, at least the gas is removed from the liquid and exhausted to the outside of the liquid container by sucking it up. Therefore, the deaeration can be accomplished very efficiently. Further, the deaerating apparatus has a simple construction, thus eliminating the need for performing a complicated deaerating operation.

A treatment solution can be applied to a substrate after gas is sufficiently removed from the treatment solution.

The deaerating apparatus is capable of supplying the treatment solution to a substrate after gas is sufficiently removed therefrom and has a simple construction, thus eliminating the need for performing a complicated deaerating operation.

Liquid can be fed out from the liquid container by merely inserting the feed-out pipe into the feed-out portion of the head member.

Gas can be absorbed very efficiently by the absorbing means by interposing the sealing member between the liquid container and the head member.

The head member is allowed to be compact because the gas exhausting pipe and the liquid feed-out pipe are coaxial with each other or the gas exhausting pipe, the liquid feed-out pipe, and the liquid introducing pipe are coaxial with one another.

Because the liquid container is conic, a gas having a low specific gravity is collected to the upper center of the liquid container by the rotation of the liquid container.

Although the present invention has been shown and described with respect to a best mode embodiment thereof, it should be understood by those skilled in the art that the foregoing and various other changes, omissions, and additions in the form and detail thereof my be made therein without departing from the spirit and scope of the present invention.

What is claimed is:

1. A deaerating apparatus for removing a gas from a liquid, comprising:
    a liquid container, having a conical shape with an opening at a top thereof, rotatable around a vertical axis;
    a rotating means for rotating said liquid container;
    a head member which is movable so as to be capable of approaching and leaving the opening;
    a liquid introducing pipe, bored through the head member, for introducing the liquid into the liquid container;
    a gas exhausting pipe, bored through the head member, for exhausting gas-containing substance from the liquid container;
    a liquid feed-out pipe, bored through the head member, and being immersed in a liquid stored in the liquid container;
    a pump connected to the liquid feed-out pipe;
    a sealing member interposed between the liquid container and the head member; and
    a means for moving the head member up and down.

2. The deaerating apparatus according to claim 1, wherein the liquid introducing pipe, the gas exhausting pipe and the liquid feed-out pipe are placed coaxially with each other.

3. The deaerating apparatus according to claim 1, wherein a liquid surface sensor is provided in the head member.

4. A deaerating apparatus for removing a gas from a liquid, comprising:
    a liquid container, having a conical shape with an opening at a top thereof, rotatable around a vertical axis;
    a rotating means for rotating said liquid container;
    a head member rotatable together with the liquid container, being placed movably so as to be capable of approaching and leaving the opening;
    a liquid introducing pipe, bored at the center of the head member, for introducing the liquid into the liquid container;
    a gas exhausting pipe, bored through the head member coaxially with the liquid introducing pipe, for exhausting gas-containing substance from the liquid container;
    a liquid feed-out pipe, bored through the head member coaxially with both the liquid introducing pipe and the gas exhausting pipe, and being immersed in a liquid stored in the liquid container;
    a pump connected to the liquid feed-out pipe; and
    a bearing and a lip sealing member each of which is interposed between the liquid container and the head member.

5. The deaerating apparatus according to claim 4, wherein a liquid surface sensor is provided in the head member.

6. A treatment apparatus for effecting a predetermined treatment by supplying a substrate with a liquid, comprising:
    a treatment liquid supplying nozzle for supplying the substrate with a treatment liquid;
    a treatment liquid feed-out means for feeding said treatment liquid to the treatment liquid supplying nozzle;
    a treatment liquid pipe interposed between the treatment liquid feed-out means and the treatment liquid supplying nozzle; and
    a deaerating apparatus, positioned on the treatment liquid pipe, for removing a gas from the treatment liquid,
    wherein the deaerating apparatus comprises:
    a liquid container, having a conical shape with an opening at a top thereof, rotatable around a vertical axis;
    a rotating means for rotating said liquid container;
    a head member which is movably placed so as to be capable of approaching and leaving the opening;
    a liquid introducing pipe, bored through the head member, for introducing the liquid into the liquid container;
    a gas exhausting pipe, bored through the head member, for exhausting gas-containing substance from the liquid container;
    a liquid feed-out pipe, bored through the head member, and being immersed in a liquid stored in the liquid container;
    a pump connected to the liquid feed-out pipe and further comprising a sealing member interposed between the liquid container and the head member and a means for moving the head member up and down.

7. The treatment apparatus according to claim 6, wherein the liquid introducing pipe, the gas exhausting pipe and the liquid feed-out pipe are placed coaxially with each other.

8. The treatment apparatus according to claim 6, wherein a liquid surface sensor is provided in the head member.

9. The treatment apparatus according to claim 6, wherein the liquid container functions as a buffer tank.

10. The treatment apparatus according to claim 6, wherein the treatment liquid supplying nozzle is positioned in proximity to a surface of a substrate.

11. The treatment apparatus according to claim 6, wherein the treatment liquid supplying nozzle consists of a stream nozzle having a single liquid discharging opening formed thereon.

12. The treatment apparatus according to claim 6, wherein the treatment liquid supplying nozzle consists of a multi-nozzle having a plurality of liquid discharging openings formed thereon.

13. The treatment apparatus according to claim 6, wherein the treatment liquid supplying nozzle moves along a side of a substrate.

14. A treatment apparatus for effecting a predetermined treatment by supplying a substrate with a treatment liquid, comprising:

a treatment liquid supplying nozzle for supplying the substrate with the treatment liquid;

a treatment liquid feed-out means for feeding the treatment liquid to the treatment liquid supplying nozzle;

a treatment liquid pipe interposed between the treatment liquid feed-out means and the treatment liquid supplying nozzle; and a deaerating apparatus, positioned on the treatment liquid pipe, for removing a gas from the treatment liquid, wherein the deaerating apparatus comprises:

a liquid container, having a conical shape with an opening at a top thereof, rotatable around a vertical axis;

a rotating means for rotating said liquid container;

a head member rotatable together with the liquid container, being movably placed so as to be capable of approaching and leaving the opening;

a liquid introducing pipe, bored at the center of the head member, for introducing the liquid into the liquid container;

a gas exhausting pipe, bored through the head member coaxially with the liquid introducing pipe, for exhausting gas-containing substance from the liquid container;

a liquid feed-out pipe, bored through the head member coaxially with both the liquid introducing pipe and the gas exhausting pipe, and being immersed in a liquid stored in the liquid container;

a pump connected to the liquid feed-out pipe; and a bearing and a lip sealing member each of which is interposed between the liquid container and the head member.

15. The treatment apparatus according to claim 14, wherein a liquid surface sensor is provided in the head member.

16. The treatment apparatus according to claim 14, wherein the treatment liquid supplying nozzle is positioned in proximity to a surface of a substrate.

17. The treatment apparatus according to claim 14, wherein the treatment liquid supplying nozzle consists of a stream nozzle having a single liquid discharging opening formed thereon.

18. The treatment apparatus as set forth in claim 14, wherein said treatment liquid supplying nozzle consists of a multi-nozzle having a plurality of liquid discharging openings formed thereon.

19. The treatment apparatus according to claim 14, wherein the treatment liquid supplying nozzle moves along a side of a substrate.

20. A process of deaerating a gas contained in a liquid, comprising the steps of:

(a) moving a head member which is movably placed on an opening of a liquid container so as to be capable of approaching and leaving the opening, and being apart from the opening;

(b) introducing the liquid containing the gas into the liquid container;

(c) rotating the liquid container;

(d) moving the head member into the opening; and (e) absorbing at least the gas present inside the liquid container, thus exhausting the gas to an outside of the liquid container.

21. The process according to claim 20, wherein the liquid container is a conical container having an opening at a top thereof, wherein in step(a), the leaving of the head member from the opening is achieved by moving the head member upwards, wherein in step (c) the liquid container is rotated about a vertical axis, and wherein in step (d) the head member is moved into the opening by moving the head member downwards.

22. The process according to claim 20, wherein in step (c) the liquid container is rotated at a rate of between 100–3000 rpm.

* * * * *

UNITED STATES PATENT AND TRADEMARK OFFICE
CERTIFICATE OF CORRECTION

PATENT NO. : 5,993,518
DATED : November 30, 1999
INVENTOR(S) : Kiyohisa Tateyama It is certified that error appears in the above-identified patent and that said Letters Patent is hereby corrected as shown below:

Column 9,
Line 48, replace "thereof my be made" with -- thereof may be made --

Signed and Sealed this

Twenty-ninth Day of June, 2004

JON W. DUDAS
*Acting Director of the United States Patent and Trademark Office*